(12) United States Patent
Mittelberger et al.

(10) Patent No.: US 10,968,994 B2
(45) Date of Patent: Apr. 6, 2021

(54) DRIVE TRAIN FOR A VEHICLE

(71) Applicant: ZF Friedrichshafen AG, Friedrichshafen (DE)

(72) Inventors: Christian Mittelberger, Ravensburg (DE); Stefan Blattner, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/497,035

(22) PCT Filed: Mar. 15, 2018

(86) PCT No.: PCT/EP2018/056490
§ 371 (c)(1),
(2) Date: Sep. 24, 2019

(87) PCT Pub. No.: WO2018/184808
PCT Pub. Date: Oct. 11, 2018

(65) Prior Publication Data
US 2020/0116244 A1 Apr. 16, 2020

(30) Foreign Application Priority Data
Apr. 4, 2017 (DE) .................... 10 2017 205 662.2

(51) Int. Cl.
*B60K 17/02* (2006.01)
*F16H 37/04* (2006.01)
(Continued)

(52) U.S. Cl.
CPC ............. *F16H 37/043* (2013.01); *B60K 1/00* (2013.01); *B60K 17/02* (2013.01); *B60K 17/08* (2013.01);
(Continued)

(58) Field of Classification Search
CPC ........ F16H 37/043; F16H 3/089; F16H 48/06; F16H 2200/0021; F16H 2200/0039;
(Continued)

(56) References Cited

U.S. PATENT DOCUMENTS 9,822,860 B2    11/2017  Kaltenbach et al.
2002/0073792 A1*  6/2002  Okada ................. F16H 61/0403
                                                74/336 R
(Continued)

FOREIGN PATENT DOCUMENTS

DE   10 2011 110 258 A1   12/2011
DE   10 2013 204 227 A1    9/2014
DE   10 2015 208 825 A1   11/2016

OTHER PUBLICATIONS

International Search Report Corresponding to PCT/EP2018/056490 dated Jun. 15, 2018.
(Continued)

*Primary Examiner* — Justin Holmes
(74) *Attorney, Agent, or Firm* — Davis & Bujold PLLC; Michael J. Bujold

(57) ABSTRACT

A drive-train for a vehicle having at least one electric drive unit (EM) which is, or can be, coupled by way of a driveshaft (AW) to at least a first transmission stage (i1), a second transmission stage (i2) and a third transmission stage (i3). At least one shifting device having at least two interlocking shifting elements (S1, S2) is provided for engaging the first and second transmission stages (i1, i2), and a frictional shifting element (S3) is provided for traction a force support of the first and the second transmission stages. The frictional shifting element (S3) is also provided for engaging the third transmission stage (i3).

11 Claims, 3 Drawing Sheets

(51) Int. Cl.
*B60K 1/00* (2006.01)
*B60K 17/08* (2006.01)
*B60K 17/16* (2006.01)
*F16D 11/14* (2006.01)
*F16D 13/00* (2006.01)
*F16H 3/089* (2006.01)
*F16H 48/06* (2006.01)

(52) U.S. Cl.
CPC ............ *B60K 17/165* (2013.01); *F16D 11/14* (2013.01); *F16D 13/00* (2013.01); *F16H 3/089* (2013.01); *B60K 2001/001* (2013.01); *F16H 48/06* (2013.01); *F16H 2200/0021* (2013.01); *F16H 2200/0039* (2013.01); *F16H 2200/2005* (2013.01)

(58) Field of Classification Search
CPC ..... F16H 2200/2005; F16H 2003/0811; F16H 37/04; B60K 1/00; B60K 17/02; B60K 17/08; B60K 17/165; B60K 2001/001; F16D 11/14; F16D 13/00; B60Y 2400/421; B60Y 2400/73; B60Y 2400/424

See application file for complete search history.

(56) References Cited

U.S. PATENT DOCUMENTS

| | | | |
|---|---|---|---|
| 2013/0160587 A1* | 6/2013 | Ibamoto | F16H 3/08 74/331 |
| 2015/0375750 A1* | 12/2015 | Toyota | B60W 30/19 701/48 |
| 2016/0017958 A1 | 1/2016 | Wu et al. | |
| 2017/0037936 A1 | 2/2017 | Park et al. | |

OTHER PUBLICATIONS

Written Opinion Corresponding to PCT/EP2018/056490 dated Jun. 15, 2018.

\* cited by examiner

DRIVE TRAIN FOR A VEHICLE

This application is a National Stage completion of PCT/EP2018/056490 filed Mar. 15, 2018, which claims priority from German patent application Ser. No. 10 2017 205 662.2 filed Apr. 4, 2017.

FIELD OF THE INVENTION

The present invention relates to a drive-train for a vehicle.

BACKGROUND OF THE INVENTION

Drive-trains with automated manual transmissions are known, which use interlocking shifting elements with which, however, only gearshifts with traction force interruption can be carried out. Furthermore, drive-trains with powershift transmissions are known, in which frictional shifting elements are used to carry out traction-force-maintaining gearshifts, such as dual-clutch transmissions and automatic transmissions.

From the document DE 10 2013 204 227 A1 a drive-train for a vehicle having at least one electric drive unit is known, which unit can be coupled via a driveshaft to at least a first transmission stage and a second transmission stage. In addition at least one shifting device for engaging the transmission stages is provided, such that the shifting device comprises at least one interlocking shifting element and at least one frictional shifting element in order to carry out powershifts. Each of the transmission stages can be engaged with the interlocking shifting element and at least one of the transmission stages can also be engaged both with the interlocking shifting element and with the frictional shifting element. In a corresponding design with at least three wheel planes, at least one further, additional interlocking shifting element would have to be used, which would increase the fitting space occupied.

SUMMARY OF THE INVENTION

Consequently, the purpose of the present invention is to propose a traction-force-supported drive-train of the type described to begin with, in which the fitting space is kept small.

According to the invention this objective is achieved by the characteristics specified in the principal claim, whereas advantageous design features and further advantages emerge from the subordinate claims, the description and the drawings.

A drive-train for a vehicle is proposed, which comprises at least one electric drive unit that is or can be coupled by way of a driveshaft to at least a first transmission stage, a second transmission stage and a third transmission stage. In this, at least one shifting device with two interlocking shifting elements is provided for engaging the first and the second transmission stages. For supporting the traction force of the first and second transmission stages the shifting device comprises a frictional shifting element. In this case the frictional shifting element is also provided for engaging the third transmission stage.

The first transmission stage is in the form of a first spur gear stage with a first fixed wheel and a first loose wheel. The second transmission stage is in the form of a second spur gear stage with a second fixed wheel and a second loose wheel, and the third transmission stage is in the form of a third spur gear stage with a third fixed wheel and a third loose wheel.

As interlocking shifting elements, claw clutches are provided. The interlocking shifting elements or claw clutches can be two individual shifting elements or in the form of a double shifting element with a neutral position and two further shift positions. Such a double shifting element would be a dual claw clutch, i.e. a two-sided claw shifting element. Claw clutches reduce fuel consumption and are cheaper compared with frictional clutches.

In a first embodiment the first, second and third fixed wheels are provided on an intermediate shaft, whereas the first and second loose wheels can be connected to the driveshaft by the interlocking shifting elements, or in each case by one of the interlocking shifting elements, and the third loose wheel can be connected to the driveshaft by means of the frictional shifting element. The intermediate shaft is connected to a drive output differential.

In a further embodiment the first, second and third fixed wheels are connected to the driveshaft, whereas the first and second loose wheels can be connected to an intermediate shaft by the interlocking shifting elements, or in each case by one of the interlocking shifting element, and the third loose wheel can be connected to the intermediate shaft by the frictional shifting element. In this case the intermediate shaft is connected to a drive output differential.

In a further embodiment the first transmission stage is in the form of a first spur gear stage with a first fixed wheel and a first loose wheel, while the second transmission stage is a second spur gear stage with a second fixed wheel and a second loose wheel, whereas the third transmission stage is in the form of a direct gear. The first and second loose wheels can be connected to the driveshaft by means of the interlocking shifting elements, or in each case by one of the interlocking shifting elements. Starting from the driveshaft, the power flow in the first and second transmission stages passes via the first or the second transmission stage to the intermediate shaft, which is in the form of a countershaft. From there, the power flow passes by way of a drive output constant to a drive output shaft, which is connected to a drive output differential or an axle transmission. The third transmission stage is in the form of a direct gear. This is produced by the frictional shifting element, which can connect the driveshaft to the output shaft in order to obtain the direct gear.

In the various example embodiments described, the third transmission stage is the highest gear with the lowest gear ratio. In the case of the direct gear, the lowest gear ratio is equal to 1.

BRIEF DESCRIPTION OF THE DRAWINGS

Below, the invention is explained further with reference to the drawings, which show.

DETAILED DESCRIPTION OF THE PREFERRED EMBODIMENTS

Figure 1:
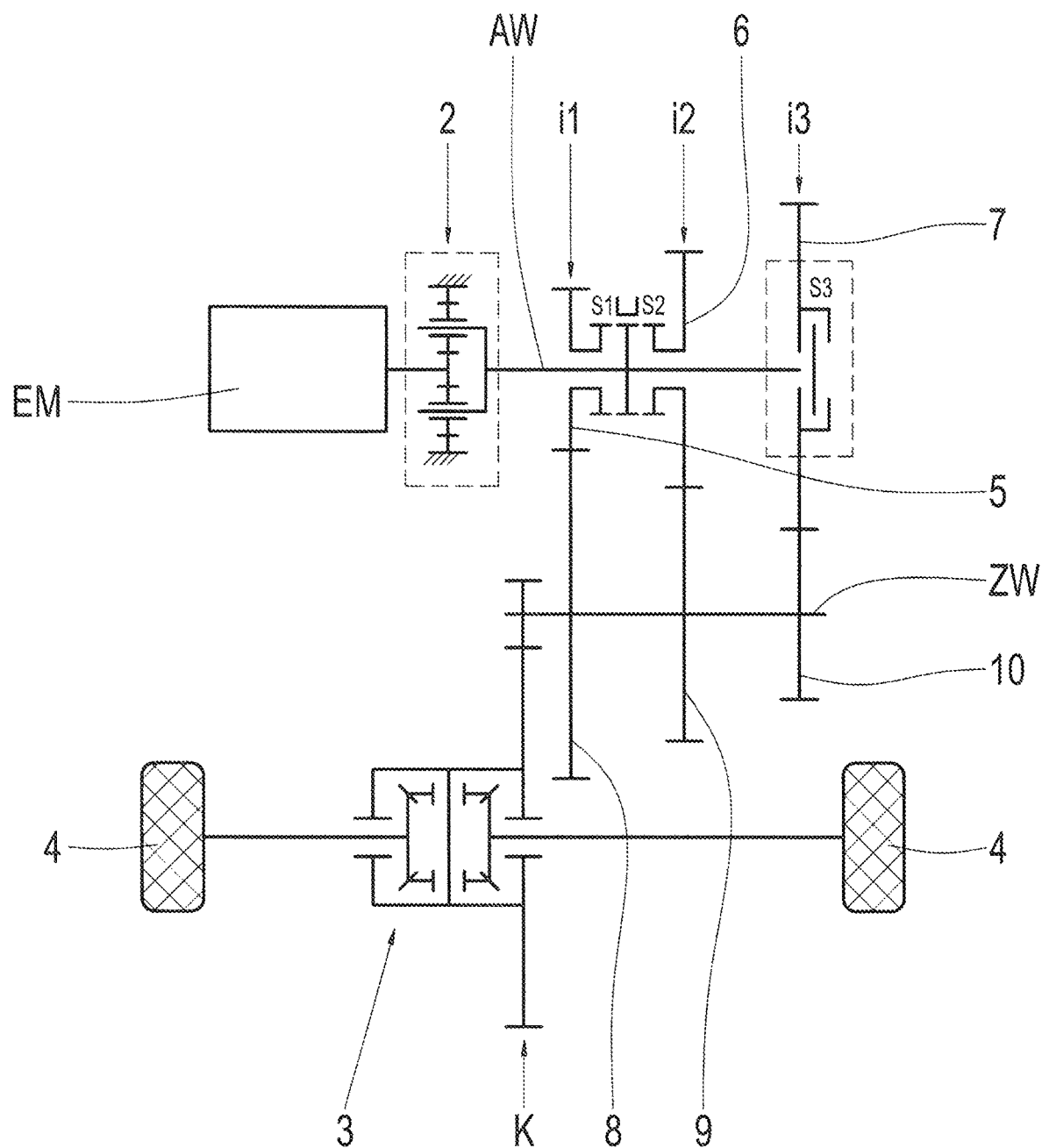
FIG. 1: A schematic view of a first embodiment of a drive-train according to the invention, with spur gear stages that can be engaged on the drive input shaft side as transmission stages mounted transversely.
Figure 2:
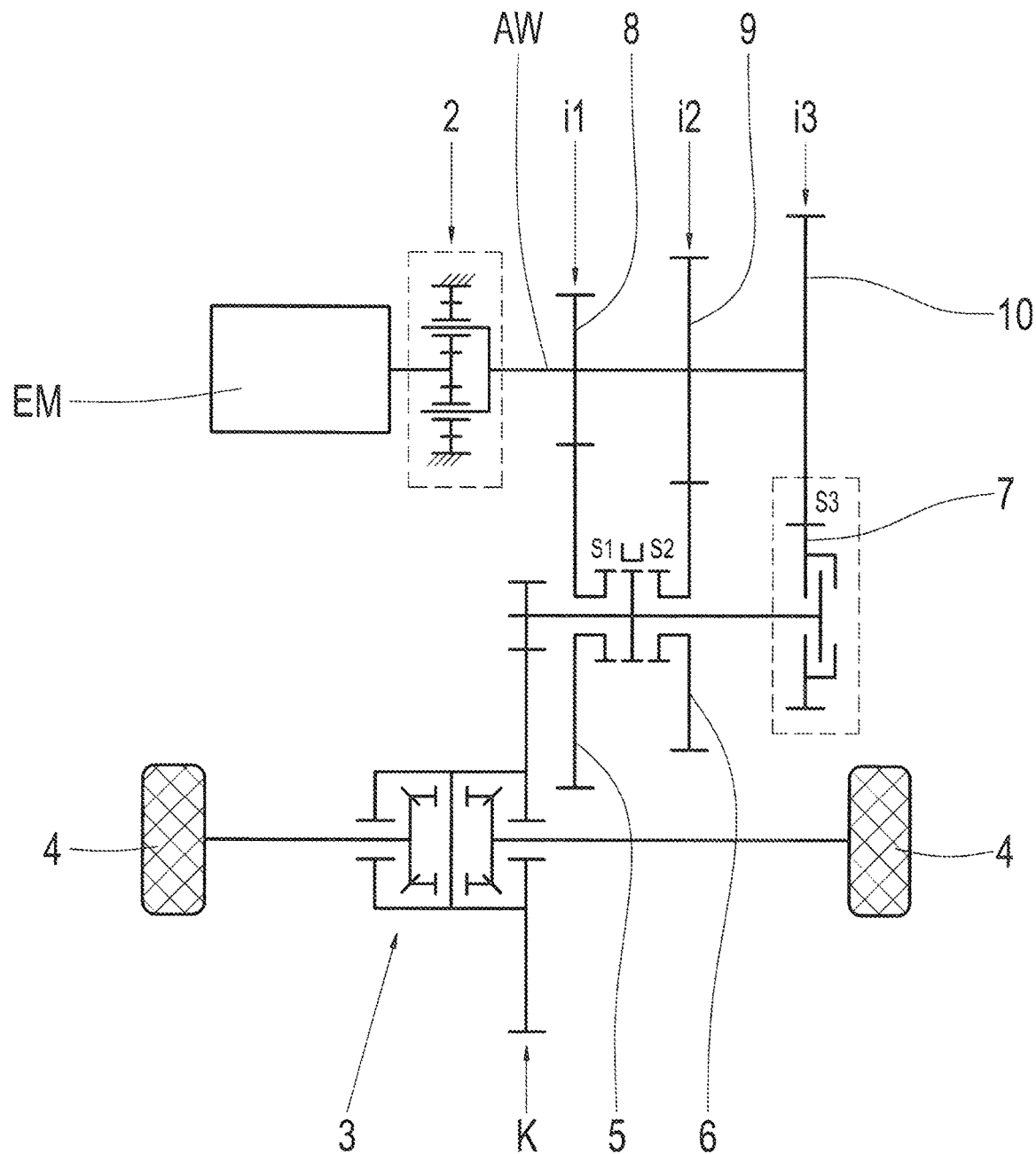
FIG. 2: A schematic view of a second embodiment of a drive-train according to the invention, with spur gear stages that can be engaged on the intermediate shaft side as transmission stages mounted transversely.
Figure 3:
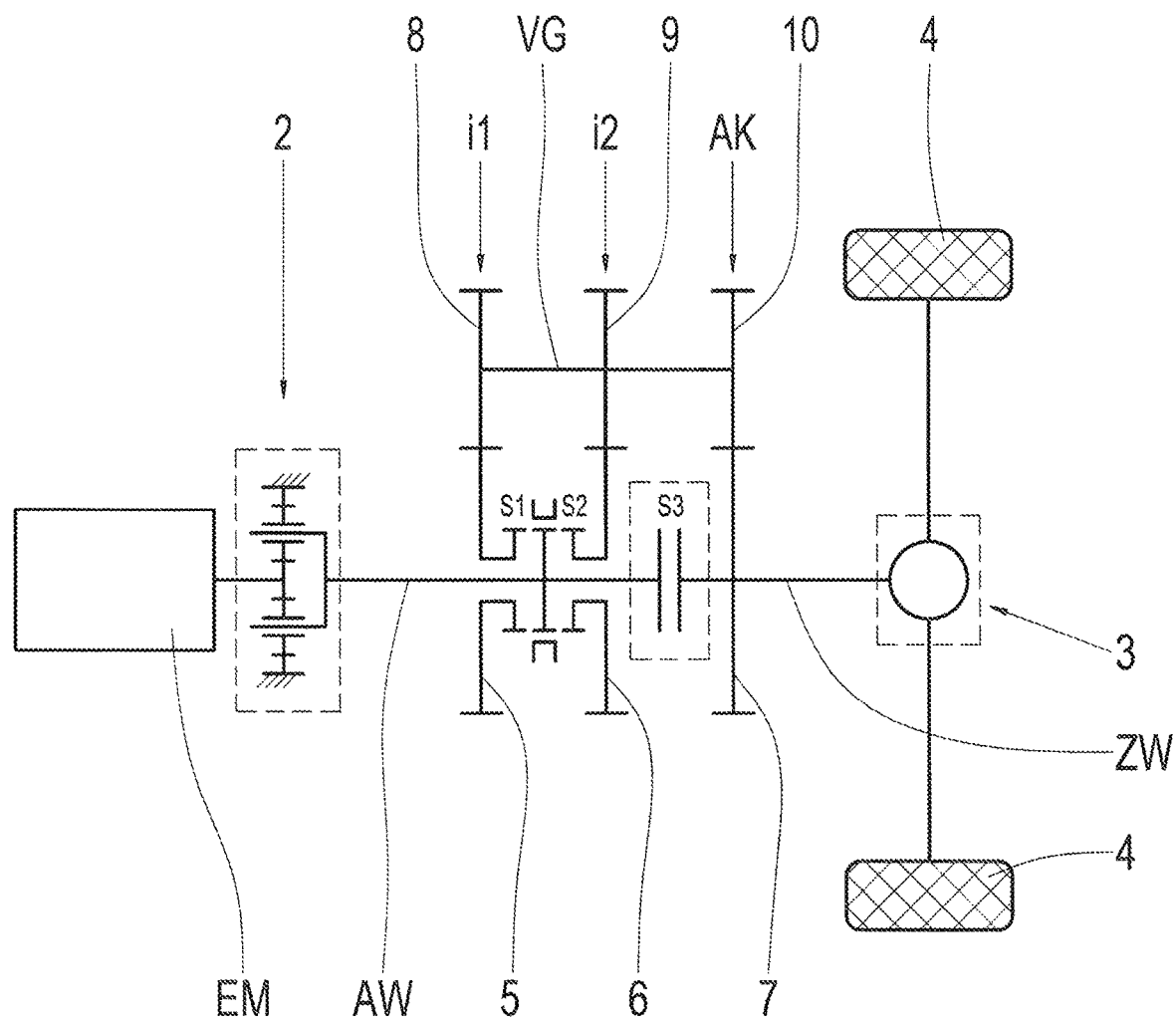
FIG. 3: A schematic view of a third embodiment of a drive-train according to the invention, with spur gear stages that can be engaged on the drive input shaft side as transmission stages mounted longitudinally.

FIGS. 1 to 3 show examples of different embodiments of a drive-train according to the invention for a vehicle, in particular a motor vehicle. The drive-train comprises an electric drive unit EM in the form of an electric machine, which drives a driveshaft AW directly or via a pre-transmission ratio 2. In addition at least three transmission stages i1, i2 and i3 are provided, which are connected at least by way of an intermediate shaft ZW to a drive output differential 3 or an axle transmission of the vehicle in order to drive the drive-wheels 4 of the vehicle. Associated with the transmission stages i1, i2 and i3 is a shifting device comprising two interlocking shifting elements S1 and S2 and one frictional shifting element S3. The transmission stages i1, i2 and i3 and the shifting elements S1, S2 and S3, together with an optional pre-transmission ratio, form a transmission device.

FIG. 1 shows a first embodiment. The electric drive unit EM is connected by way of an optional pre-transmission ratio 2 to the driveshaft AW, and drives the latter. The transmission stages i1, i2 and i3 are in the form of spur gear stages, each respectively having a loose wheel 5, 6 and 7 and a fixed wheel 8, 9 and 10. To the driveshaft AW a first loose wheel 5 of the first transmission stage i1 is fitted and can be engaged. This can be coupled to the driveshaft AW by a first of the two interlocking shifting elements S1. To the driveshaft AW a second loose wheel 6 of the second transmission stage i2 is also fitted and can be engaged. This can be coupled to the driveshaft AW by a second of the two interlocking shifting elements S2. The first and second shifting elements S1 and S2 are in the form of a two-sided claw shifting element, which besides a central position in the middle can adopt at least two further shift positions in which, respectively, either the first shifting element S1 couples the first loose wheel 5 to the driveshaft AW or the second shifting element S2 couples the second loose wheel 6 to the driveshaft AW. Furthermore, a third loose wheel 7 of the third transmission stage i3 is fitted on the driveshaft AW and can be engaged therewith by means of the frictional shifting element S3 in the form of a frictional clutch. The associated fixed wheel 8 of the first transmission stage i1, the second fixed wheel 9 of the second transmission stage i2 and the third fixed wheel 10 of the third transmission stage i3 are mounted in a rotationally fixed manner on an intermediate shaft, this intermediate shaft ZW being arranged parallel to the driveshaft AW. On the intermediate shaft ZW is provided a further fixed wheel of a constant K in the form of a fourth transmission stage, which is provided in order to transmit the drive power from the intermediate shaft ZW to the drive output differential 3 and hence to the drive-wheels 4 of the vehicle. In this case the driveshaft AW forms a transmission input shaft and the intermediate shaft ZW a drive output shaft of the transmission device.

The drive-train shown in FIG. 1 is designed for transverse mounting, wherein the first and second transmission stages i1 and i2 are engaged by claw clutches. The frictional clutch S3 is provided in addition for engaging the third transmission stage i3 for the powershift or supporting gearshift, via a higher gear during the engagement of the first or second transmission stage i1 or i2. For example, if a shift is to be made from the first transmission stage i1 to the second transmission stage i2, the shifting process begins with a load takeover by the frictional clutch S3. Then, the first shifting element S1 is disengaged. A rotational speed adaptation takes place until the second shifting element S2 can be closed. Now, the frictional clutch S3 can be opened again.

Since the frictional clutch S3 can be used for engaging a transmission stage and for a powershift or a supporting gearshift, a further clutch is saved so that in accordance with the set objective the construction cost can be reduced. A powershift is possible both for a power upshift and for a power downshift, since the traction force interruption during upshifts can be compensated for by a boost (second power) at the electric drive unit EM. The use of interlocking shifting elements S1 and S2 in the form of claw-type shifting elements ensures lower fuel consumption and inexpensive actuation in the first two transmission stages i1 and i2.

FIG. 2 shows a second embodiment variant. The electric drive unit EM is connected by way of an optional pre-transmission ratio 2 to the driveshaft AW and drives the latter. The transmission stages i1, i2 and i3 are each in the form of spur gear stages with respective loose wheels 5, 6 and 7 and respective fixed wheels 8, 9 and 10. Instead of being on the driveshaft AW the loose wheels 5, 6 and 7 of the transmission stages i1, i2 and i3 and the shifting elements S1, S2 and S3 are in this case arranged on the intermediate shaft ZW and the fixed wheels of the transmission stages i1, i2 and i3 are on the driveshaft AW. A first loose wheel 5 of the first transmission stage i1 is mounted on and can be engaged with the intermediate shaft ZW. It can be coupled to the intermediate shaft ZW by a first of the two interlocking shifting elements, S1. On the intermediate shaft ZW is also mounted a second loose wheel 6 of the second transmission stage i2. This can be coupled to the intermediate shaft ZW by means of a second of the two interlocking shifting elements S2. The first and second shifting elements S1 and S2 are made as a two-sided claw-type shifting element, which besides a central position in the middle can adopt at least two further shift positions in which, respectively, either the first shifting element S1 couples the first loose wheel 5 to the intermediate shaft ZW, or the second shifting element S2 couples the second loose wheel 6 to the intermediate shaft ZW. Furthermore, a third loose wheel 7 of the third transmission stage i3 is mounted on and can be engaged with the intermediate shaft ZW, which loose wheel can be coupled by means of the frictional shifting element S3 in the form of a friction clutch to the intermediate shaft ZW. The associated first fixed wheel 8 of the first transmission stage i1, the second fixed wheel 9 of the second transmission stage i2 and the third fixed wheel 10 of the third transmission stage i3 are mounted in a rotationally fixed manner on the driveshaft AW, and the intermediate shaft ZW is arranged parallel to the driveshaft AW. Again, on the intermediate shaft ZW is provided a fixed wheel of a constant K in the form of a fourth transmission stage, which is provided in order to transmit the drive power from the intermediate shaft ZW to the drive output differential 3 and from there to the vehicle wheels 4. In this case too, the driveshaft AW forms a transmission input shaft and the intermediate shaft ZW a drive output shaft of the transmission device.

The drive-train shown in FIG. 2 is also provided for transverse mounting, wherein the first and second transmission stages i1 and i2 are engaged by means of claw shifting elements. The frictional clutch S3 is additionally provided for engaging the third transmission stage i3 for the powershift or supporting gearshift via a higher gear during the engagement of the first or second transmission stage i1 or i2. For example, if a shift is to be carried out from the first transmission stage i1 to the second transmission stage i2, the shifting process begins with a load takeover by the frictional clutch S3. Then the first shifting element S1 is disengaged. A rotational speed adaptation takes place until the second shifting element S2 can be closed. Now, the frictional clutch S3 can be opened again.

Since the frictional clutch S3 can be used to engage a transmission stage and to carry out a powershift or supporting gearshift, a further clutch is saved so that in accordance with the set objective the construction cost can be reduced. A powershift is possible for both traction upshifts and traction downshifts, since the traction force interruption during traction upshifts can be compensated for by a boost (second power) at the electric drive unit EM. The use of interlocking shifting elements S1 and S2 in the form of claw-type shifting elements ensures lower fuel consumption and cheaper actuation in the first two transmission stages i1 and i2. In addition this embodiment is advantageous since the gearwheels can be made with larger diameters than in the first example embodiment.

FIG. 3 shows an embodiment designed for longitudinal mounting of the drive-train. The electric drive unit EM is connected via an optional pre-transmission ratio 2 to the driveshaft AW, which it drives. The first two transmission stages i1 and i2 are in the form of spur gear stages with respective loose wheels 5 and 6 and respective fixed wheels 8 and 9. On the driveshaft AW is mounted a first loose wheel 5 of the first transmission stage i1, which can be engaged. This can be coupled to the driveshaft AW by a first, namely S1, of the two interlocking shifting elements. A second loose wheel 6, of the second transmission stage i2, is also mounted on and can be engaged with the driveshaft AW. This can be coupled to the driveshaft AW by a second, namely S2, of the two interlocking shifting elements. The first and second shifting elements S1 and S2 are made as a two-sided claw-type shifting element, which besides a central position in the middle can adopt at least two further shift positions, in which, respectively, either the first shifting element S1 couples the first loose wheel 5 to the driveshaft AW or the second shifting element S2 couples the second loose wheel 6 to the driveshaft AW. The associated first fixed wheel 8 of the first transmission stage i1 and the second fixed wheel 9 of the second transmission stage i2 are mounted rotationally fixed on a countershaft VG, this countershaft VG being arranged parallel to the driveshaft AW. On the countershaft VG there is a further fixed wheel 10 which belongs to a drive output constant AK, which is provided in order to transmit the drive power from the countershaft VG via an intermediate shaft ZW to the drive output differential 3 and hence to the wheels 4 of the vehicle. Here, the driveshaft AW forms a transmission input shaft and the intermediate shaft ZW a drive output shaft of the transmission device.

In FIG. 3 the frictional clutch S3 is again additionally provided for engaging the third transmission stage i3 for the powershift or supporting gearshift via a higher gear during the engagement of the first or second transmission stage i1 or i2. The higher gear is the direct gear with a transmission ratio equal to 1. A shifting process with traction force support takes place as in the previous examples.

Also with this embodiment, a further clutch for a third transmission stage is saved, in that the frictional clutch S3 can be used for engaging a transmission stage and for a powershift or supporting gearshift, whereby in accordance with the stated objective the construction cost can be reduced. A powershift is possible for traction upshifts and traction downshifts since the traction force interruption can be compensated for by a boost (second power) at the electric drive unit EM.

All the embodiments shown are based on the same fundamental idea and differ only in their designs.

INDEXES

EM Electric drive unit
2 Pre-transmission ratio
AW Driveshaft
i1 First transmission stage
i2 Second transmission stage
i3 Third transmission stage
ZW Intermediate shaft
3 Drive output differential
4 Drive-wheels
S1 Interlocking shifting element
S2 Interlocking shifting element
S3 Frictional shifting element
5 First loose wheel
6 Second loose wheel
7 Third loose wheel
8 First fixed wheel
9 Second fixed wheel
10 Third fixed wheel
AK Drive output constant
VG Countershaft

The invention claimed is:

1. A drive-train for a vehicle comprising:
at least one electric drive unit which is coupleable, via a driveshaft, to at least a first transmission stage, a second transmission stage and a third transmission stage,
the first transmission stage is a spur gear stage with a first fixed wheel and a first loose wheel, the second transmission stage is a second spur gear stage with a second fixed wheel and a second loose wheel,
at least one shifting device having at least two interlocking shifting elements, for engaging the first and the second transmission stages, respectively, and a frictional shifting element for traction force support of the first and the second transmission stages, and either
the third transmission stage is a third spur gear stage with a third fixed wheel and a third loose wheel, all of the first, the second and the third fixed wheels are fixed to one of the driveshaft and an intermediate shaft, and all of the first, the second and the third loose wheels are connectable to the other one of the driveshaft and the intermediate shaft, and the frictional shifting element being provided for engaging the third transmission stage, or
the third transmission stage is a direct gear, and the frictional shifting element engages the direct gear.

2. The drive-train according to claim 1, wherein the interlocking shifting elements are formed as claw clutches.

3. The drive-train according to claim 1, wherein the interlocking shifting elements are formed as a dual claw clutch which has a neutral position and two shift positions.

4. The drive-train according to claim 1, wherein transmission stage is the direct gear.

5. The drive-train according to claim 4, wherein the first and the second loose wheels are connectable to the driveshaft in each case by a respective one of the interlocking shifting elements, and in the first and the second transmission stages a connection is made between the driveshaft and a drive output differential via a countershaft, a drive output constant and the intermediate shaft.

6. The drive-train according to claim 4, wherein the direct gear is implemented by connecting the driveshaft to the intermediate shaft via the frictional shifting element.

7. The drive-train according to claim 1, wherein the third transmission stage is a highest gear which has a lower transmission ratio than a transmission ratio of the first and the second transmission stages.

8. A drive-train for a vehicle comprising:
at least one electric drive unit which is coupleable, via a driveshaft, to at least a first transmission stage, a second transmission stage and a third transmission stage, at least one shifting device having at least two interlocking shifting elements, for engaging the first and the second transmission stages, and a frictional shifting element for traction force support of the first and the second transmission stages, the frictional shifting element being provided for engaging the third transmission stage, the first transmission stage is a spur gear stage with a first fixed wheel and a first loose wheel, the second transmission stage is a second spur gear stage with a second fixed wheel and a second loose wheel, and the third transmission stage is a third spur gear stage with a third fixed wheel and a third loose wheel, and the first, the second and the third fixed wheels are fixed in common to one of the driveshaft and an intermediate shaft, the first and the second loose wheels are connectable, via a respective one of the interlocking shifting elements, to the other one of the driveshaft and the intermediate shaft, and the third loose wheel is connectable, via the frictional shifting element, to the other one of the driveshaft and the intermediate shaft.

9. The drive-train according to claim 8, wherein the first, the second and the third fixed wheels are fixed to the intermediate shaft, and the first and the second loose wheels are connectable, via the respective one of the interlocking shifting elements, to the driveshaft, and the third loose wheel is connectable to the driveshaft by the frictional shifting element, and the intermediate shaft is connected to a drive output differential.

10. The drive-train according to claim 8, wherein the first, the second and the third fixed wheels are connected to the driveshaft, and the first and the second loose wheels are connectable, via the respective one of the interlocking shifting elements, to the intermediate shaft, and the third loose wheel is connectable, via the frictional shifting element, to the intermediate shaft, and the intermediate shaft is connected to a drive output differential.

11. A drive-train for a vehicle comprising:

at least one electric drive unit which is coupleable, via a driveshaft, to at least a first transmission stage, a second transmission stage and a third transmission stage, the first transmission stage has a first fixed wheel and a first loose wheel, and the second transmission stage has a second fixed wheel and a second loose wheel;

a shifting device which is shiftable to at least first and second shift positions, the shifting device having at least first and second interlocking shifting elements, in the first shift position of the shifting device the first interlocking shifting element engaging the first transmission stage in a transmission of drive power from the driveshaft to a drive output, and in the second shift position of the shifting device the second interlocking shifting element engages the second transmission stage in the transmission of the drive power from the driveshaft to the drive output; and a frictional shifting element being shiftable to engage the third transmission stage in the transmission of the drive power from the driveshaft to the drive output to support a traction force of the first and the second transmission stages during shifting of the shifting device between the first and the second shift positions; and either the third transmission stage has a third fixed wheel and a third loose wheel, all of the first, the second and the third fixed wheels are fixed to one of the driveshaft and an intermediate shaft, and all of the first, the second and the third loose wheels are connectable to the other one of the driveshaft and the intermediate shaft, and the frictional shifting element engages the third transmission stage, or the third transmission stage is a direct gear, and the frictional shifting element engages the direct gear.

* * * * *